(12) United States Patent
David

(10) Patent No.: US 7,326,267 B2
(45) Date of Patent: Feb. 5, 2008

(54) DEVICE FOR SEPARATION OF WASTE IN A VACUUM CLEANER

(75) Inventor: Fabien David, Notre Dame de l'Isle (FR)

(73) Assignee: SEB S.A., Ecully Cedex (FR)

( * ) Notice: Subject to any disclaimer, the term of this patent is extended or adjusted under 35 U.S.C. 154(b) by 408 days.

(21) Appl. No.: 10/994,455

(22) Filed: Nov. 23, 2004

(65) Prior Publication Data
US 2005/0115212 A1 Jun. 2, 2005

(30) Foreign Application Priority Data
Nov. 27, 2003 (FR) .................................. 03 13914

(51) Int. Cl.
*B01D 45/12* (2006.01)
(52) U.S. Cl. .................. 55/337; 55/413; 55/459.1; 55/DIG. 3
(58) Field of Classification Search .................. 55/410, 55/413, 414, 337, 459.1, DIG. 3
See application file for complete search history.

(56) References Cited

U.S. PATENT DOCUMENTS 5,271,750 A 12/1993 Abbott et al.
6,857,165 B2* 2/2005 Oh .............................. 15/353
2003/0182756 A1 10/2003 Duggan

FOREIGN PATENT DOCUMENTS

GB 2 384 451 A 7/2003

OTHER PUBLICATIONS

Nagano Yoji, "Cyclone Separation Device And Strainer For The Same", JP11290724, (Oct. 26, 1999), abstract only.

* cited by examiner

*Primary Examiner*—Robert A. Hopkins
(74) *Attorney, Agent, or Firm*—Browdy and Neimark, PLLC

(57) ABSTRACT

A device for separating and collecting waste entrained by an air flow generated by a suction group in a vacuum cleaner, the device having an air inlet tube opening in a tangential direction into a waste separation chamber, a conduit having a plurality of openings being located in a central part of said chamber, the conduit being in communication with the suction group, and the chamber being connected to a tank for collecting waste. According to the invention, the conduit has inclined walls directed toward the separation chamber, in the direction of circular movement of the air flow in the separation chamber, and the end of each wall has a substantially flat opening that is parallel to the underlying and adjacent conduit. The openings in the conduit are situated in line with the openings in the walls.

18 Claims, 5 Drawing Sheets

DEVICE FOR SEPARATION OF WASTE IN A VACUUM CLEANER

BACKGROUND OF THE INVENTION

The present invention concerns appliances of the vacuum cleaner type for picking up dirt, dust, debris, etc., referred to generally herein as "waste". More particularly, the invention relates to vacuum cleaners that separate the waste from the suction air by centrifuging.

The present invention is directed particularly to improvements in waste separation devices using a generally cylindrical separation chamber, in which air is caused to rotate and exits the chamber through openings provided in a conduit at the center of the chamber.

French patent document 2 786 682, incorporated herein by reference, describes such an appliance having a central conduit is provided at its periphery with a multitude of holes having substantially radially extending axes. A tank for recovering the waste is disposed under the central conduit and closes the separation chamber.

Thus, when the main suction group is in operation, the waste on the floor being cleaned is suctioned with the aid of a conduit that generally terminates in a nozzle and is connected to the separation chamber. The air flow loaded with waste then penetrates to the interior of the separation chamber along a tangential direction.

The heavier waste pieces, or particles, are then separated from the main air flow, by centrifuging, and also by the barrier constituted by the conduit provided with holes. These waste particles then fall into the recovery tank.

International application WO 03/047412, incorporated herein by reference, describes a waste separation device comprising an air inlet conduit opening along a tangential direction into a waste separation chamber defining an internal volume having substantially the form of a cylinder.

According to one of the particularities of this device, the cylindrical separation chamber has a separation screen, which is also cylindrical, in the central part of the chamber. This screen separates the chamber from a conduit connected to the suction group, which conduit has, in particular, a filtration group.

The chamber has, moreover, a channel for evacuation of the waste in a radial direction. The channel is coupled to a sealed tank for collecting the centrifuged waste. This channel can also extend in a tangential direction.

In a manner analogous to the description in the document previously described, when the main suction group is placed in operation, the air flow loaded with waste penetrates to the interior of the separation chamber with a high speed obtained by the dimensional configuration of the different parts of the device, and particularly the small passage cross section at the level of the separation chamber.

The heaviest waste particles are then separated from the main air flow by centrifuging and also by the action of the cylindrical screen. They then penetrate into the sealed tank via the evacuation channel.

Such a device produces a relatively good separation of waste, taking into account the high speed of the air in the separation chamber and the fact that the suctioned air, penetrating into the chamber in a direction tangential to the cylindrical screen, must pass through openings provided in the screen, which implies a change in direction close to 90° on average.

Improvements in the above-described separation device are disclosed in the Japanese patent document 11290724 in which, according to one of the embodiments, the holes in the central conduit are masked by walls in the form of quarters of a sphere.

FIGS. 1, 2a and 2b herein illustrate the progress in this art. FIG. 1 shows the principle of a chamber for separation by centrifuging, in which the air enters tangentially into a separation chamber 2 and is forced to penetrate into a multitude of openings formed in a central conduit 6. The separated waste particles 8 then drop into a tank 10.

FIG. 2a shows an air trajectory by a solid line and a waste particle trajectory with a dotted line at the level of an opening 4 of the separator shown in FIG. 1. As shown in this Figure, air penetrates into opening 4 by having its trajectory deflected through an angle of around 90°. The heavier particles, as a result of their velocity, cannot change the direction of their trajectory. In addition, by the centrifugal effect, these particles are displaced toward the periphery of the cylindrical separation chamber, from which they are recovered in tank 10.

Certain particles, and particularly those that are lightest, remain close to openings 4 and can pass through these openings by slightly changing their trajectory, as shown by the dotted line in FIG. 2a.

Thus, the performance of such a separator is limited by this phenomenon since the smallest particles are poorly separated.

FIG. 2b shows the proposed improvement provided by the device according to one of the embodiments disclosed in the Japanese patent document 11290724. According to this simplified diagram, the device has walls 12 in the form of a quarter of a sphere masking openings 41 in the direction of circular movement of the air. These walls cause the finest particles to be oriented toward the periphery of the separation chamber and to thus follow a trajectory that distances them from the openings, as represented by the dotted line. Overall, the separation power of the device is improved.

However, the trajectory of the entraining air must follow a more tortuous path in order to enter into openings 41 since this requires that the trajectory of the air be deflected by around 180° in order to enter into conduit 6, as shown by the solid line in FIG. 2b. This results in supplementary pressure drops, thereby requiring more powerful, and thus more costly, suction sources.

Moreover, the form of wall 12, which extends, at its base, at a right angle to conduit 6, generates turbulence phenomena t that affect the separation of the particles. It is feared that this can create dust accumulation zones that can become sources for the development of undesired bacteria.

BRIEF SUMMARY OF THE INVENTION

The present invention seeks to improve, in particular, the separation of waste within a centrifugal separation device, without increasing the size of the device, and without increasing pressure losses, with the aid of an inexpensive means.

The present invention is achieved by the provision of a device for separating and collecting waste entrained by an air flow generated by a suction group of a vacuum cleaner, the device comprising an air inlet tube opening in a tangential direction into a waste separation chamber, a conduit having a plurality of openings being located in a central part of said chamber, the conduit being in communication with the suction group, and the chamber being connected to a tank for collecting waste. According to the invention, the conduit has walls that are inclined toward the separation chamber, in the direction of circular movement of the air flow in the separation chamber, and the end of each wall has a substantially flat opening that is parallel to the underlying and adjacent conduit. The openings in the conduit are situated in line with, or facing, the openings in the wall and are spaced from the openings in the wall in a radial direction relative to the longitudinal axis of the conduit.

The presence of oblique walls at the level of the openings of the conduit causes the particles to become spaced from the conduit. However, the presence of openings at the ends of these walls minimizes the loss of pressure by facilitating the passage of air into the conduit. Such a solution thus permits a springboard effect for the particles, caused by the walls, to be associated with a certain facility of the air to penetrate into the conduit.

In effect, each opening behaves like a small individual separator due to its capacity to separate the trajectories of the particles from the air. The multiplicity of the openings permits a reduction in the velocity of air at the level of each opening, which limits the pressure losses without, at the same time, reducing the effectiveness of centrifuging that is associated on the one hand with the velocity of the air but equally with the radius of curvature of the air trajectory. By significantly reducing that radius of curvature, as is the case here, one can thus obtain a good centrifuging performance while limiting the pressure losses.

Advantageously, the walls are bounded, at one side and the other, by lateral sides that come to bear on the conduit. The presence of these sides prevents particles from passing alongside the inclined walls and penetrating into the openings of the conduits, i.e. prevents creation of, in a certain sense, an aeraulic short circuit. Separation of the particles is thus improved.

The geometry of the inclined walls is also defined in such a manner that they do not overlap one another in order to not create dead zones where dust could arrive to accumulate. Thus, there is maintained a slight flow of circulating air at each side of said walls without at the same time penetrating directly into the openings due to the presence of lateral sides.

Preferably, the openings are disposed in staggered rows for an improved covering over the height of the conduit in a direction perpendicular to the direction F of passage of the air.

According to one alternative, the openings at the level of the conduit are elongated in the direction of circular movement of the air, in a manner to extend past the free ends of the inclined walls, and past the substantially flat openings at the free ends of the inclined walls, with respect to the direction of circular movement of the air. This arrangement permits further limiting the losses of pressure mainly by increasing the air passage cross section, which locally reduces its velocity.

Experimental tests have shown that the best results are obtained by an inclination of the walls comprised between 10° and 35° relative to the conduit wall.

According to preferred forms of construction of the invention, the device for separating and collecting waste has at least 500 inclined walls which constitute as many particle separators.

Other tests relating to the size of the openings have shown that an opening in the walls having a width of less than 2.5 mm and preferably equal to 1.5 mm, or a cross section of less than 4.9 mm$^2$ and preferably equal to 1.76 mm$^2$ gives the best results.

One of the preferred embodiments of the invention consists in giving the cylindrical separation chamber the form of a torus whose inner cylindrical face defines the conduit for coupling with the suction group. This arrangement permits the separation chamber to be easily delimited, the waste being expelled toward an attached receptacle.

Advantageously, the diametral cross section of the torus is comprised between 1 time and 4 times the smallest cross section of the channels for conducting the waste from the nozzle, permitting a substantial air velocity to be maintained, while retaining a compact form for the system.

According to this embodiment, the main device for separating and collecting waste has a second filtration means in the form of a filter disposed in a housing located under the separation chamber and in aeraulic communication therewith. Such an arrangement permits simplification of the architecture of the appliance while offering a greater latitude with regard to design of the filter. This latter can be a pleated filter, permitting the separation surface area to be increased and thus retarding clogging of said filter. Such an assembly makes possible a compact system whose filtration effectiveness can attain levels of the type referred to as "HEPA", depending on the filtration power of the pleated filter.

DETAILED DESCRIPTION OF THE INVENTION

Figure 1:
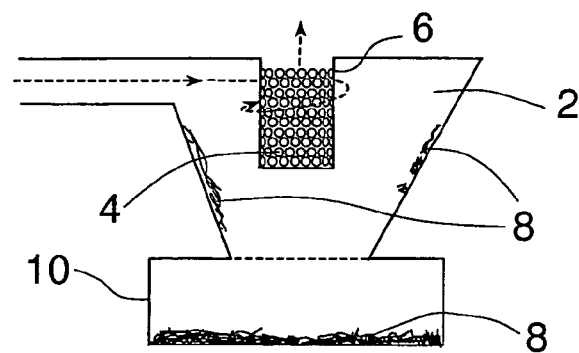
FIGS. 1, 2a and 2b illustrate the prior art.
Figure 2A:
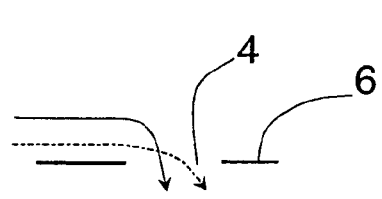
Figure 2B:
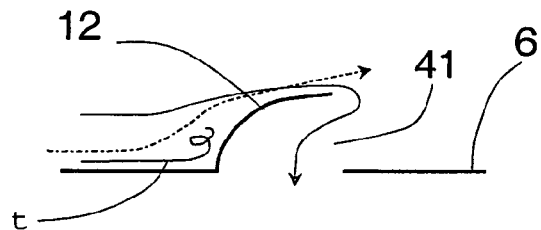
Figure 2C:
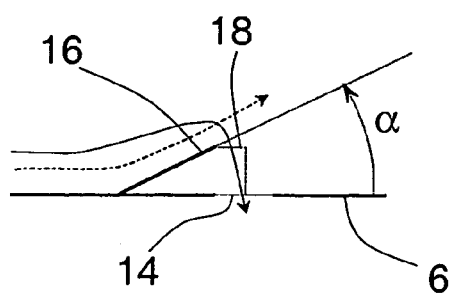
FIG. 2c is a diagram illustrating the principle of the present invention.

Referring to FIG. 2c, in comparison with FIGS. 1, 2a and 2b previously described, the present invention is characterized by the presence, on air evacuation conduit 6, at the level of openings 14 of the conduit, of inclined walls 16 that are supported on the conduit and extend at an angle a to this same conduit. These walls are inclined in the direction of circular movement of the air introduced into the chamber.

Moreover, each wall 16 is provided, at its free end, with a substantially flat opening 18 that is substantially parallel to the conduit at this location. Each opening 18 is in aeraulic communication with an opening 14, these openings being parallel to, and facing, one another.

By this arrangement, the trajectory of the finest particles, shown by a dotted line, follows the inclined wall and thus moves away from, and passes, the conduit. The particles are in a certain sense ejected by the springboard, or ramp, formed by inclined walls 16.

However, the air can flow through opening 18 formed in each wall, which opening is substantially parallel to the underlying conduit, to the evacuation conduit without having to significantly alter its trajectory. The trajectory shown by a solid line symbolizes the trajectory of the air and shows that the outlet of air across the conduit is aided by the presence of openings 18, without substantially degrading the separation of the particles.

According to this embodiment, the pressure losses are minimized by increasing the size of the openings at the level-of the conduit. Thus, as can be seen in FIG. 2c, and also in FIG. 3, openings 14 are prolonged in front of the inclined walls, which permits the air to reach these openings with less deflection of its trajectory, which thus signifies reduced pressure losses.

This augmentation of openings 14 must however remain small, in order to not provide an easy passage for waste particles. This aspect thus results in a compromise between reducing pressure losses and reducing separation efficiency.

Figure 3:
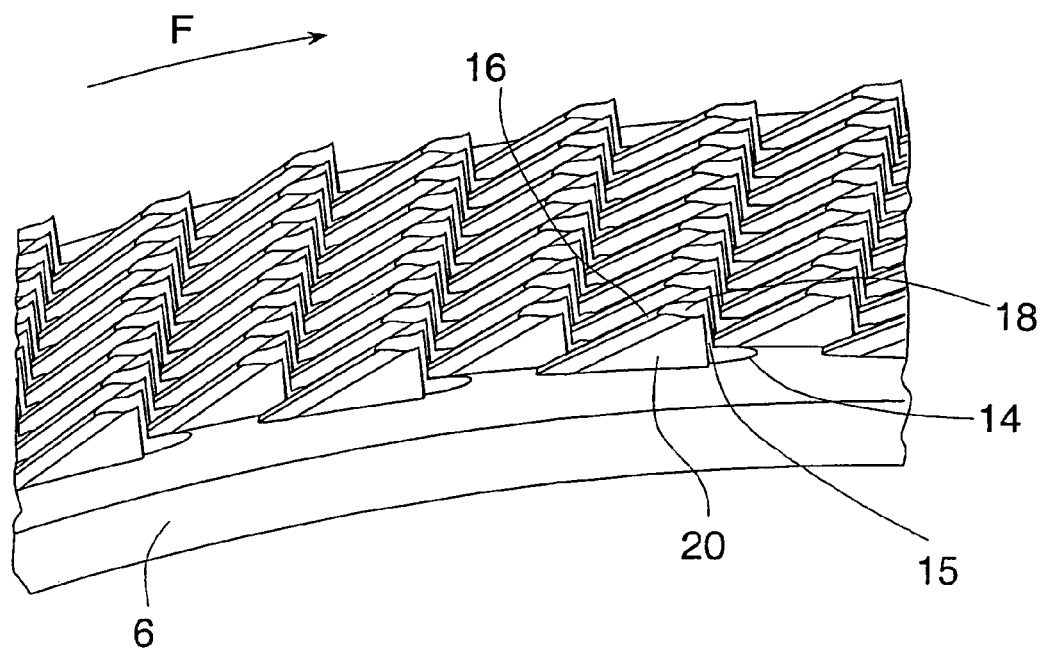
FIG. 3 is a perspective view of a portion of the main separation device according to the invention.

FIG. 3 shows a portion of a practical device for separating waste based on the principle explained above. Thus, conduit 6 has a cylindrical form and has, over substantially its entire height, a multitude of openings 14 for the passage of air.

In the direction F of flow of air, a wall 16 is disposed in front of each opening 14. Each inclined wall 16 has, at its free end, the opening 18 that communicates with a respective opening 14 at the free frontal edge 15. Advantageously, walls 16 have lateral sides 20 that are supported on conduit 6 and that prevent particles from penetrating into openings 14 by flowing around walls 16. The sides thus constitute longitudinal edges of the inclined walls. By thus protecting openings 14 and multiplying the inclined walls, the particles are forced to travel along said walls to be projected away from openings 14.

It will be noted that the close arrangement of openings 14, walls 16 and sides 20 constitute veritable full particle separators.

Figure 4:
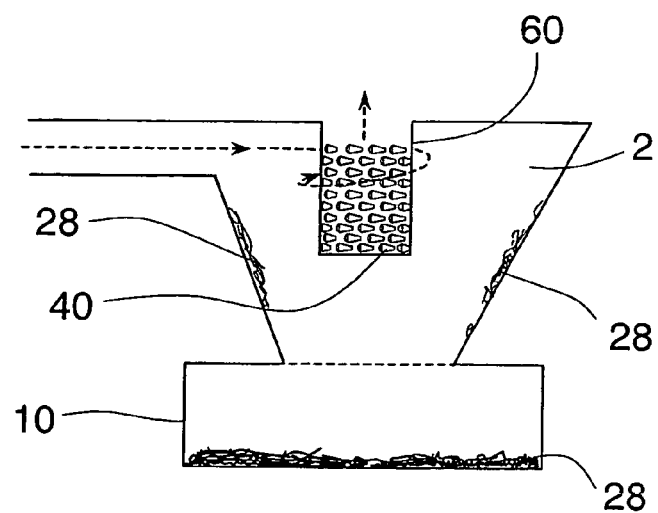
FIG. 4 is a simplified pictorial view of a first embodiment of the invention.

FIG. 4 shows, in a view similar to that of FIG. 1, a simplified pictorial view of a centrifugal separator having an embodiment of a separation device according to the invention.

This device comprises a separation chamber 2 at the center of which is disposed a conduit 60 connected to the motor-ventilator group (not shown) of the vacuum cleaner. Chamber 2 is connected to a tank 10 for collecting waste separated by the device. According to the invention, conduit 60 has a plurality of separators 40, as described above and shown in detail in FIG. 3. Each separator 40 is defined by the combination of an inclined wall 16 associated with two lateral sides 20, and an opening 14 provided in the wall of conduit 60, in line with an associated opening 14. Preferably, in the direction F of air flow, each opening 14 extends past its associated opening 18.

Thus, air loaded with waste collected from the floor surface being cleaned penetrates into chamber 2 along a path tangential to the axis of that chamber in order to eventually penetrate into conduit 60. The air travels along walls 16 of separators 40 where waste 28, including the finest particles, are separated, as previously explained in connection with the description of FIG. 2c. The separated waste 28 then falls under the effect of gravity into tank 10.

FIGS. 5-10 illustrate a second embodiment of the invention.

Figure 5:
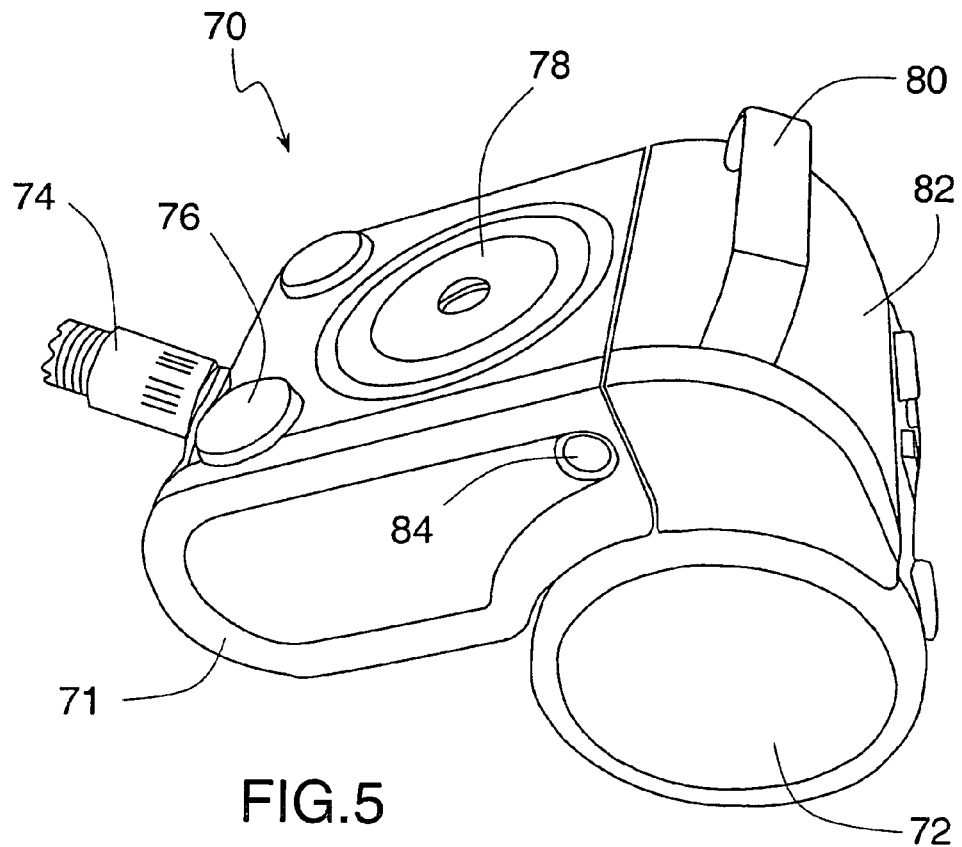
FIG. 5 is a perspective view of a vacuum cleaner equipped with a second embodiment of the invention.

FIG. 5 provides an overall view of a vacuum cleaner 70 having a separation device according to the invention. Vacuum cleaner 70 has a case 71 that is supported on several wheels, including a rear wheel 72, the other wheels not being visible in FIG. 5. An aeraulic connection 74 connects case 71 to a nozzle that can be placed in contact with the surface to be cleaned, resulting in the suctioning of waste to the interior of body 71. Body 71 contains a motor-ventilator group (not shown) of conventional construction, for generating a suction air flow capable of suctioning waste present on the surface to be cleaned. A button 76 is provided to turn the vacuum cleaner on and off.

The separation chamber containing the separation device according to the invention is accessible through a protection cover, or lid, 78. Waste separated by the device is evacuated toward a tank, or other receptacle, 82 that is easily accessible to the user and that has a gripping handle 80. This handle also serves as a handle for carrying the appliance, the orientation of the appliance when in use and the presence of handle 80 at the top facilitating gripping of the handle while avoiding any rocking movement of the appliance about its center of gravity. Tank 82 is secured to case 71 by a suitable latch arrangement of a known type and a button 84 is provided to permit tank 82 to be unlatched from case 71. Advantageously, two buttons 84 can be provided, one on each side of case 71.

Figure 6:
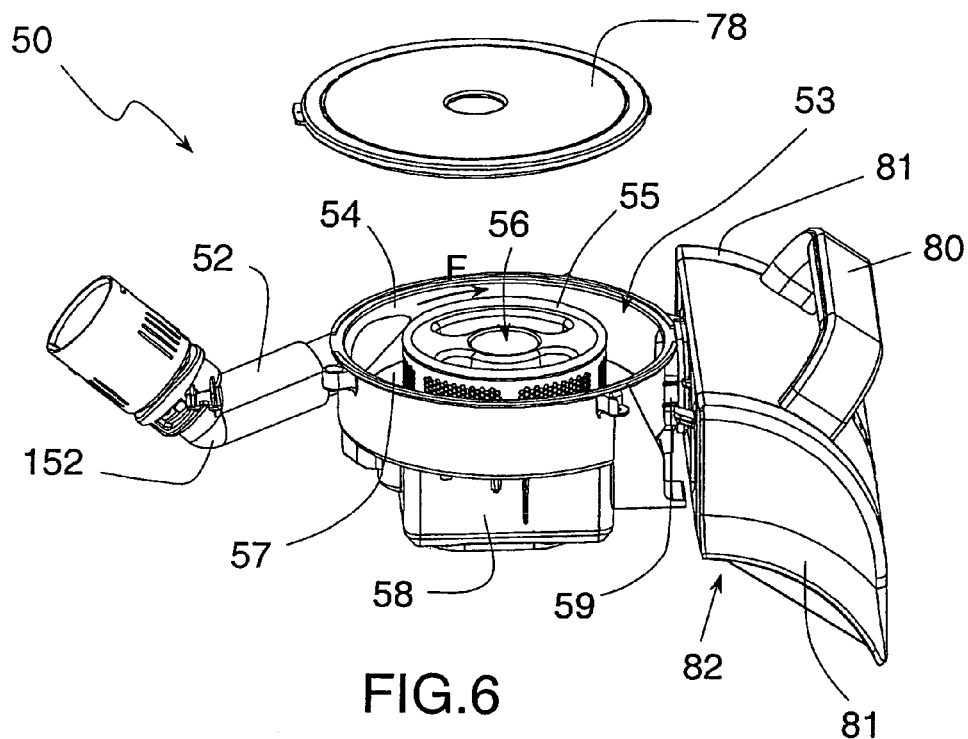
FIG. 6 is a partially exploded perspective view showing interior elements of the second embodiment of the invention.

As shown in FIG. 6, waste separation device 50 includes an air inlet conduit 52 opening into a separation chamber 53 similar to a torus having a rectangular diametral cross section. Advantageously, air inlet conduit 52 has an elbow 152 that acts to reduce the probability that some waste particles will directly strike air evacuation conduit 56.

The air flow passage cross section in chamber 53 is delimited by an outer circular wall 54, an inner circular wall 55, an upper wall constituted by lid 78, and a bottom wall 57.

Circular inner wall 55 forms the outer wall of air evacuation conduit 56. This conduit is closed at its upper part and is in aeraulic communication with an underlying compartment 58 equipped with a filter, preferably a pleated filter (not shown). This compartment is in aeraulic communication with the motor-ventilator group (not shown). Such a configuration provides greater freedom with regard to dimensioning of the filter. The filter can be constructed according to techniques already known to those skilled in the art.

The embodiment shown in FIGS. 5-10 has the advantage that it enables the separation chamber to have a relatively small height with respect to waste inlet conduit 52. The cross section of the separation chamber nevertheless has a ratio of 1 to 4 times the smallest cross section of the passage for conducting waste from the nozzle, such as disclosed in the International Application WO 03/047412, the disclosure of which is incorporated herein by reference. It is to be understood that suitable sealing means are provided to prevent any escape of air at the level of the separation chamber.

Figure 7:
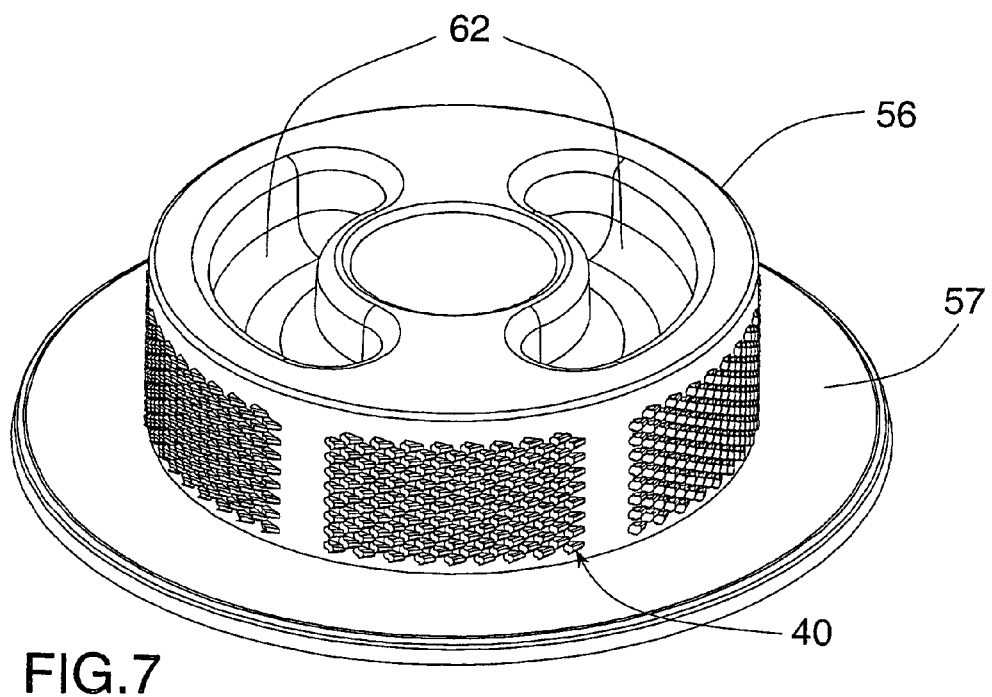
FIG. 7 is a perspective view of one component of the second embodiment of the invention.

According to the invention, and as is shown most clearly in FIG. 7, conduit 56 has a multitude of separators 40, as previously described. These separators are distributed, for example, in six substantially equal sectors, each sector having, by way of example, 136 separators. Thus, in this embodiment there would be a total of 816 particle separators, which is considerable when one takes into account the small size of the device.

According to the example illustrated, the width of each opening 18 presented by each wall 16 is of the order of 1.5 mm, walls 16 extend at an angle of the order of 30° relative to the outer surface of separator 56, and the length of each wall, generally in the direction F of air flow is of the order of 1.8 mm. Each opening 14 may have a diameter of the order of 2 mm. The outer diameter of conduit 56 is of the order of 106 mm.

FIG. 7 also shows that conduit 56 and bottom wall 57 form a one-piece unit which eliminates sealing problems between those components.

Moreover, the closed upper end of conduit 56 has two depressed regions, or recesses 62, which are disposed symmetrically with respect to the longitudinal axis of device 56 and have the general form of circular arcs. These recesses permit gripping of the separation device by the user without touching zones in contact with dust, these zones being the walls of the conduit and bottom wall 57.

Removal of waste separated in chamber 53 is assured by a circumferentially extending opening in circular wall 54 of chamber 53. This opening communicates with tank 82 through a short conduit 59. Tank 82 is removable from the separation chamber and can have several different forms. According to the illustrated embodiment, the tank can be emptied via one or the other of its lateral sides, each side being closed by a removable cover 81. This arrangement permits any user, whether right-handed or left-handed, to be able to easily empty the tank.

Figure 8:
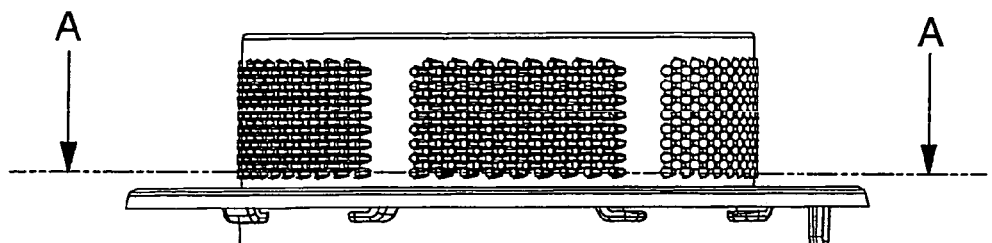
FIG. 8 is a side view of the element shown in FIG. 7.
Figure 9:
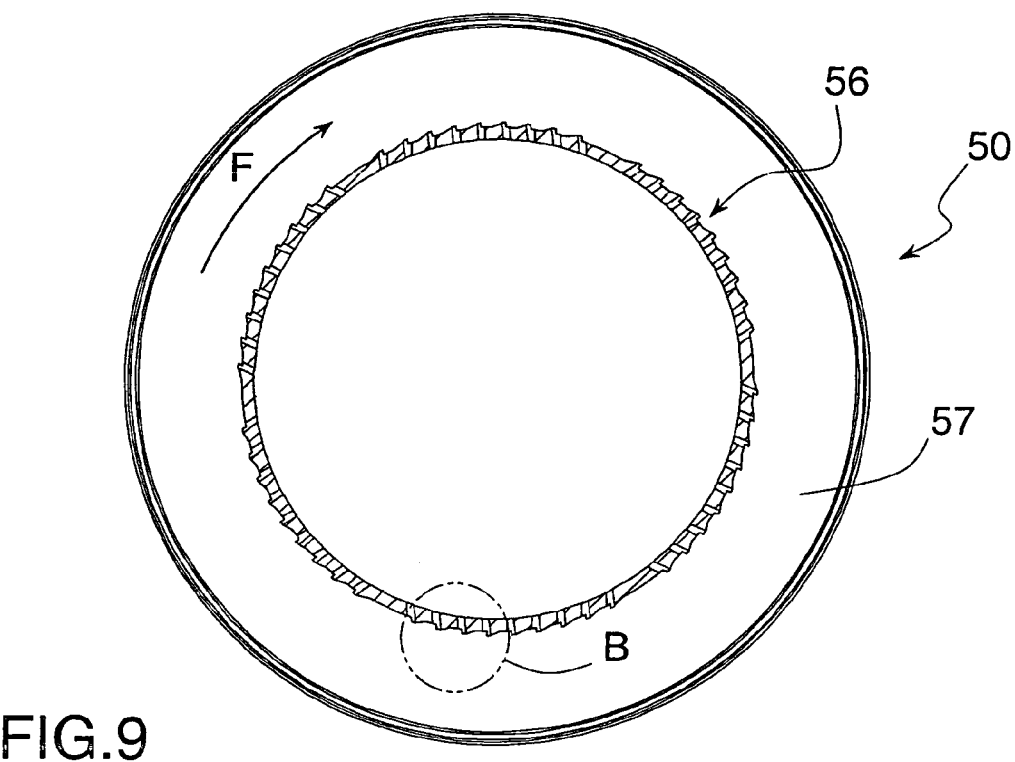
FIG. 9 is a cross-sectional view taken along the line A-A of FIG. 8.
Figure 10:
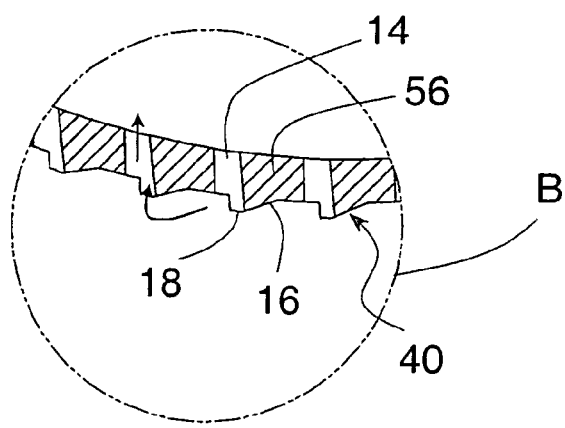
FIG. 10 is a detail view, to an enlarged scale, of the portion enclosed by circle B in FIG. 9.

FIGS. 8, 9 and 10 illustrate further details of conduit 56 and separators 40. FIG. 8 illustrates retaining elements 64 for holding compartment 58 in place, compartment 58 preferably being removable from the conduit in order to permit cleaning and/or replacement of the filter housed in that compartment.

As can be seen from the cross-sectional view of FIG. 9 and the detail view of FIG. 10, each separator has an inclined wall 16 at the end of which is provided an opening 18, while conduit 56 is provided with openings 14 each located downstream of a respective wall 16, with respect to the general direction F of movement of the air flow in the separation chamber. Each wall 16 is identical to those shown in FIGS. 2c and 3.

In operation, the user turns on the vacuum cleaner and suctions waste from a floor surface to be cleaned with the aid of a conduit that may or may not be provided with a nozzle and that is connected to communicate with separation chamber 53 through conduit 52. The flow of air loaded with waste penetrates then to the interior of the separation chamber, flowing in direction F with a velocity that may be close to 60 m/s and that can reach 100 m/s in places, such high velocity being obtained by the dimensional configuration of the different parts of the device. To achieve these values, the annular separation chamber may have a width of 30 mm and a height of 35 mm, the suction device, or group, may have a power of 1900 W and may generate a suction pressure of 30 kPa. Further details about the operation of the device for collecting waste according to the invention can be found in the above-cited document WO 03/047412.

The heaviest waste particles are then separated from the main air flow, by centrifugal action. In addition, separators 40 of conduit 56 cause the finest particles to be separated from the main air flow. These particles then pass through conduit 59 into tank 82, where they are collected. This operation is described in further detail in the above-cited document WO 03/047412.

Air passes through openings 18 and then openings 14, to the interior of conduit 56 where it is filtered by the filter contained in compartment 58. This filter provides a greater filtration in order to prevent passage of the finest dust particles. The resulting purified air is then directed toward the motor-ventilator, or suction, group.

Other embodiments of the invention are possible. It is particularly possible to configure openings 14, not by elongating them in the direction of circular movement of the air, but rather in a direction perpendicular thereto, which avoids increasing the possibility that a particle cannot alter its trajectory in order to pass into openings 14, while increasing the size of the air passage openings.

The present invention thus offers a system that is highly compact without reducing filtration quality, which requires on the one hand high air velocities, a quality essentially achieved by maintaining a substantial velocity in the separation chamber, and on the other hand an efficient waste separation device, which device is improved with respect to a device having simple holes by the presence of the "microseparators" 40.

This application relates to subject matter disclosed in French Application number FR 03 13914, filed on Nov. 27, 2003, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A device for separating and collecting waste entrained by an air flow generated by a suction group in a vacuum cleaner, said device comprising:

a waste separation chamber;

an air inlet tube opening in a tangential direction into said waste separation chamber;

a conduit having an outer wall provided with a plurality of openings, said conduit being located in a central part of said chamber and being in communication with the suction group; and a tank connected to said chamber for collecting waste, wherein said conduit has a plurality of waste separation walls that extend outwardly from said outer wall and are inclined toward said separation chamber, in the direction of circular movement of the air flow in said separation chamber, each inclined separation wall being associated with a respective one of said plurality of openings in said conduit, each of said separation walls has an outer end provided with a substantially flat opening that is parallel to said conduit and that is located above and adjacent said conduit, and each said opening in said conduit outer wall is situated at the base of the associated opening in a respective one of said inclined separation walls.

2. The separation device of claim 1, wherein each of said separation walls has two lateral edges and is bounded, at said lateral edges, by lateral sides that bear on said conduit outer wall.

3. The separation device of claim 1, wherein said openings in said conduit outer wall are elongated in the direction of circular movement of the air flow, in a manner to extend past the outer ends of said inclined separation walls.

4. The separation device of claim 1, wherein said openings in said conduit outer wall have axes that are generally perpendicular to the direction of circular movement of the air flow in said separation chamber.

5. The separation device of claim 1, wherein each of said separation walls has an inclination of between 10° and 35° relative to said conduit outer wall.

6. The separation device of claim 1, wherein said conduit has at least 500 of said inclined separation walls, constituting at least 500 particle separators.

7. The separation device of claim 1, wherein each of said substantially flat openings has a dimension of less than 2.5 mm.

8. The separation device of claim 1, wherein said separation chamber has a form of a torus, the torus having an inner cylindrical face defined by said conduit.

9. The separation device of claim 8, wherein the vacuum cleaner has a channel for conducting waste from a nozzle and the torus has a diametral cross section that is between 1 time and 4 times the smallest cross section of the channel.

10. The separation device of claim 1, further comprising filtration means in the form of a filter disposed in a housing located under said separation chamber and in aeraulic communication with said separation chamber.

11. The separation device of claim 10, wherein said filter is a pleated filter.

12. A vacuum cleaner comprising the device defined in claim 1 and a channel for conducting waste from a nozzle to said waste separation chamber.

13. A device for separating and collecting waste entrained by an air flow generated by a suction group in a vacuum cleaner, said device comprising:
 a waste separation chamber;
 an air inlet tube opening in a tangential direction into said waste separation chamber;
 a conduit having an outer wall provided with a plurality of openings, said conduit being located in a central part of said chamber and being in communication with the suction group; and
 a tank connected to said chamber for collecting waste, wherein
 said conduit has a plurality of waste separation walls that extend outwardly from said outer wall and are inclined toward said separation chamber, in the direction of circular movement of the air flow in said separation chamber, each inclined separation wall being associated with a respective one of said plurality of openings in said conduit,
 each of said separation walls has an outer end provided with an opening,
 each said opening in said conduit outer wall is situated at the base of the associated opening in a respective one of said inclined separation walls, and
 each of said separation walls has two lateral edges and is bounded, at said lateral edges, by lateral sides that bear on said conduit outer wall.

14. A device for separating and collecting waste entrained by an air flow generated by a suction group in a vacuum cleaner, said device comprising:
 a waste separation chamber;
 an air inlet tube opening in a tangential direction into said waste separation chamber;
 a conduit having an outer wall provided with a plurality of openings, said conduit being located in a central part of said chamber and being in communication with the suction group; and
 a tank connected to said chamber for collecting waste, wherein
 said conduit has a plurality of waste separation walls that extend outwardly from said outer wall and are inclined toward said separation chamber, in the direction of circular movement of the air flow in said separation chamber, each inclined separation wall being associated with a respective one of said plurality of openings in said conduit,
 each of said separation walls has an outer end provided with an opening, and
 each said opening in said conduit outer wall is situated in line with, or facing, the associated opening in a respective one of said inclined separation walls.

15. The separation device of claim 14, wherein each said opening in said conduit outer wall extends past said outer end of the associated inclined separation wall, in the direction of circular movement of the air flow in said separation chamber.

16. The separation device of claim 1, wherein said opening in said outer end of each of said waste separation walls extends away from said outer end in the direction opposite to the direction of circular movement of the air flow in said separation chamber.

17. The separation device of claim 13, wherein said opening in said outer end of each of said waste separation walls extends away from said outer end in the direction opposite to the direction of circular movement of the air flow in said separation chamber.

18. The separation device of claim 14, wherein said opening in said outer end of each of said waste separation walls extends away from said outer end in the direction opposite to the direction of circular movement of the air flow in said separation chamber.

* * * * *